United States Patent [19]  [11] 3,867,400
Habermeier et al.  [45] Feb. 18, 1975

[54] PROCESS FOR THE MANUFACTURE OF 1,1-METHYLENE-BIS-(3-(HYDROXYALKYL)-HYDANTOINS)

[75] Inventors: Jurgen Habermeier, Pfeffingen; Hans Batzer, Arlesheim, both of Switzerland

[73] Assignee: Ciba-Geigy Corporation, Ardsley, N.Y.

[22] Filed: Aug. 9, 1973

[21] Appl. No.: 387,061

[30] Foreign Application Priority Data
Aug. 25, 1972 Switzerland.................. 12653/72

[52] U.S. Cl. ............................................ 260/309.5
[51] Int. Cl............................................. C07d 49/32
[58] Field of Search ................................ 260/309.5

[56] References Cited
UNITED STATES PATENTS
3,778,439  12/1973  Habermeier et al. ........ 260/256.4 C Primary Examiner—Henry R. Jiles
Assistant Examiner—C. M. S. Jaisle
Attorney, Agent, or Firm—Charles W. Vanecek

[57] ABSTRACT

Improved process for the manufacture of certain 1,1'-methylene-bis-[3-(hydroxyalkyl)-hydantoins] by addition reaction of alkylene oxide with 1,1'-methylene-bis-(hydantoins) in water or aqueous dioxane solutions. The process yields the hydroxyalkylation products in immediate high purity.

3 Claims, No Drawings

PROCESS FOR THE MANUFACTURE OF 1,1-METHYLENE-BIS-(3-(HYDROXYLALKYL)-HYDANTOINS)

The present invention relates to an improved process for the manufacture of certain 1,1'-methylene-bis-[3-(hydroxyalkyl)-hydantoin] compounds which according to the process of the invention are obtained in immediate high purity.

It is known that the catalytic addition reaction of alkylene oxides to 1,1'-methylene-bis-(hydantoins) yields the corresponding 1,1'-methylene-bis-[3-(2'-hydroxyalkyl)-hydantoins], the addition reaction being carried out in organic solvents. This addition process is described in "Helvetica Chimica Acta," volume 55, (1970), pages 686–696 and gives hydroxyalkylation products in high yield. However, this process has the disadvantage that it does not give the resulting hydroxyalkylation products in sufficiently high purity for them to be used, without purification, for the manufacture of high quality plastics products. In order that they should meet the standards demanded from them with regard to purity, they have to be recrystallised repeatedly, which is expensive and in the present instance also entails substantial losses of material. Purification of the 1,1'-methylene-bis[3-(2'-hydroxyalkyl)-hydantoins] by distillation is not realistic in industrial practice.

It has now been found that hydroxyalkylation products of certain 1,1'-methylene-bis(hydantoins) are obtained in equally high yield but, surprisingly, according to the process in immediate adequate purity, if the alkylene oxide addition reaction to 1,1'-methylene-bis-(hydantoins) is carried out in water or aqueous dioxane solutions. This smooth course of the reaction is surprising inasmuch that the publication already cited (see Helv. Chim. A., Vol. 55 (1970), page 688, 2nd paragraph) expressly teaches those skilled in the art that the hydroxyalkylation of the 1,1'-methylene-bis-(hydantoins) can, because of their high melting points and low solubility in water, only be carried out in organic solvents. Because of this statement it thus had to be assumed that the addition reaction of alkylene oxide to 1,1'-methylene-bis-(hydantoins) in water or aqueous dioxane solutions would either not proceed at all or only give low yields.

Hence, the subject of the present invention is a process for the manufacture of 1,1'-methylene-bis-[3-(2'-hydroxyalkylhydantoin] compounds of the formula

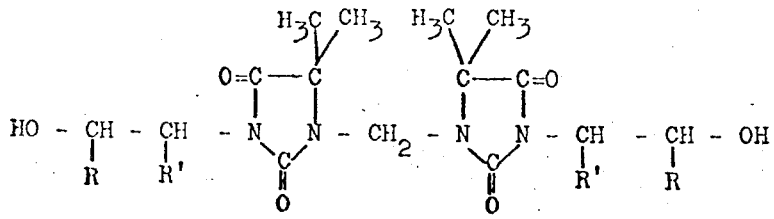

wherein R each denote a hydrogen atom or the methyl, ethyl or phenyl group and R' denotes a hydrogen atom or, together with R, denotes the tetramethylene radical, by catalytic addition reaction of ethylene oxide, propylene oxide, butylene oxide, cyclohexane oxide and/or styrene oxide to 1,1'-methylene-bis-(5,5-dimethylhydantoin), characterised in that the addition reaction is carried out in water or in 1–60 percent strength aqueous dioxane solution and in the presence of neutral or alkaline catalysts.

Preferably, the process according to the invention is carried out in deionised water or in a 1–30 percent strength aqueous dioxane solution.

Suitable alkaline catalysts are above all the tertiary amines, such as triethylamine or benzyldimethylamine, the quaternary ammonium bases, such as benzyltrimethylammonium hydroxide, quaternary ammonium salts, such as tetramethylammonium chloride or benzyltrimethylammonium chloride, or alkali metal hydroxides, such as sodium hydroxide. Neutral catalysts used are preferably the alkali metal halides or alkaline earth metal halides, such as lithium chloride, potassium chloride, barium chloride or the corresponding bromides.

The amount of catalyst to be used is as a rule between 0.3 and 15 mol%, preferably 1.5 to 7 mol%, relative to the amount of alkylene oxide employed.

The process according to the invention can be carried out either at normal pressure or under pressure, that is to say in an autoclave. If the process is carried out at normal pressure, which is a preferred embodiment of the process according to the invention, the procedure followed as a rule is that the alkylene oxide is added to the aqueous suspension containing the 1,1'-methylene-bis-5,5-dimethylhydantoin and the catalyst, at room temperature and whilst stirring, and thereafter the mixture is heated in stages, over the course of several hours, to 90°–95°C without the reaction solution boiling.

If the addition reaction is carried out in an autoclave, higher temperatures can be employed.

As a rule, 0.6 to 3 litres, preferably 1 to 2 litres, of water or aqueous dioxane solution are used per mol of 1,1'-methylene-bis-(5,5-dimethylhydantoin) in order to prepare the suspension.

The 1,1'-methylene-bis-3-[2'-(hydroxyalkyl)-hydantoins] manufactured according to the process of the invention are completely colourless, crystalline substances which are immediately obtained in a very pure form from the process. If an even higher degree of purity is required, the crystalline products can advantageously be recrystallised, in most cases from water.

EXAMPLE 1

A mixture of 805 g (3 mols) of 1,1'-methylene-bis-(5,5-dimethylhydantoin), 8 g of lithium chloride and 1,000 ml of deionised water is initially introduced into a laboratory stirred glass apparatus of 6 litres capacity, equipped with a thermometer and intensive condenser comprising a low temperature condenser. This paste is slowly stirred and a mixture of 330 g (7.5 mols) of ethylene oxide and 3 litres of deionised water is added all at once, at room temperature. The white suspension is warmed from room temperature to 50°–52°C over the course of 2 hours, with slight stirring. It is then heated to 90°C over the course of 150 minutes, during which the starting material gradually dissolves. After a total of 5 hours, from the beginning of the reaction, a clear, colourless solution is produced. To complete the reaction, the solution is stirred for a further 4 hours at 90°C. Approx. 1,200 ml of water are then distilled from the batch at 150°C bath temperature (temperature of the mixture, 70°C) by applying a water pump vacuum. The hot solution is then filtered and cooled to 5°C. The desired product crystallises out. The colourless, glistening crystals are isolated by suction filtration. The crystals are dried at 100°C in a vacuum cabinet (15 mm Hg) over $P_2O_5$.

861 g (80.6% of theory), relative to 1,1'-methylene-bis(-5,5-dimethylhydantoin)), of 1,1'-methylene-bis-[3-(2'-hydroxyethyl)-5,5-dimethylhydantoin] of melting point 163.3°C ("Mettler FP 51"; speed of heating 1°C/minute) are obtained in the form of completely colourless, glistening crystals.

A further quantity of the desired product (81 g = 7.6% of theory) of melting point 154°C (Mettler FP 51; speed of heating 1°C/minute) can be obtained from the filtrate of the above filtration by concentrating to about one-third of its volume, and cooling.

For maximum purity requirements the above product can be recrystallised from water, if necessary. 818 g of the product are recrystallised from 2 litres of water. 700.1 g (85% of the substance employed) of colourless, crystalline substance are obtained. This melts at 163.3°– 164.6°C ("Mettler FP 2") and corresponds to the "α-modification." On cooling this melt, the "β-modification," which melts at 173.4°–174.7°C, is produced (Mettler FP 2).

Elementary analysis (micro-analysis) shows the following values:

shows that the product undergoes no decomposition up to 240°C but begins to evaporate from 250°C onwards.

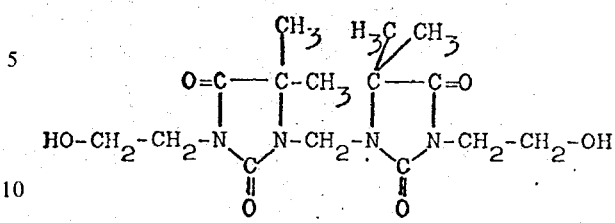

EXAMPLES 2 to 7

268.3 g (1 mol) of 1,1'-methylene-bis-(5,5-dimethylhydantoin), suspended in 1 litre of deionised water, are mixed with 5 mol% (relative to ethylene oxide) of various catalytic substances and the mixture is stirred at room temperature. A solution of 96.9 g of solution of 96.9 g of ethylene oxide (2.2 mols) in 200 ml of water, at 10°C, is added to this suspension.

The reaction mixture is stirred for 120 minutes at 55°– 60°C. It is then warmed from 60°C to 90°C over the course of a further 120 minutes, whilst stirring. Thereafter it is stirred for a further 4 hours at 90°C.

The reaction solution, whilst still hot, is then freed, by filtration, of the residue, which consists of unreacted starting material. The filtrate is concentrated to about half its volume and cooled to 0°C. The product which has precipitated is filtered off and dried at 100°C/25 mm Hg. Thereafter, the purity of the diols obtained is tested by determining the OH numbers and the melting points. The activity of various catalysts can be seen from the table which follows:

| Example | Catalyst (Amount: 5 mol% relative to ethylene oxide) | Yield of diol (% of theory) | Purity calculated from the OH number (% of diol) | Solidification point ("Mettler FP 51", speed of heating 1°C/minute) |
|---|---|---|---|---|
| 2 | No catalyst | 0% (more than 90% of the starting substance recovered unchanged) | — | Solidification point ~ 300°C |
| 3 | Tetramethylammonium chloride | 73% | — | 157°C |
| 4 | Potassium chloride | 85% | 99 | 163.5°C |
| 5 | Calcium chloride | 82% | 100 | 164°C |
| 6 | Barium chloride | 86% | 95 | 162°C |
| 7 | Sodium hydroxide solution (50% strength) | 75% | — | 159°C |

| Found | Calculated |
|---|---|
| 50.70% C | 50.55% C |
| 6.90% H | 6.79% H |
| 16.05% N | 15.72% N |

The diol thus obtained still contains a trace of water which however does not interfere with further conversion, for example the manufacture of polycondensates.

The substance contains 0.16 –0.20 percent of water (Karl Fischer titration). The OH group content of the diol is measured by determining the OH number. It is 98 –100 percent of theory.

The proton-magnetic resonance spectrum (H-NMR; 100 Hz) agrees with the structure shown below. The thermogravimetric analysis ("Mettler"; speed of heating 2°C/minute; 52 mg sample; medium: nitrogen)

EXAMPLE 8

A mixture of 268.3 g (1 mol) of 1,1'-methylene-bis-(5,5-dimethylhydantoin), 2.67 g off lithium chloride, 1,300 ml of water and 145 g (2.5 mols) of propylene oxide is warmed to 60°C for 2 hours, stirred for 2 hours at 60°c and heated over the course of 2 hours from 60°C to 90°C. Thereafter it is stirred for a further 4 hours at 90°C. Working up takes place analogously to Example 1, but the mixture is extensively concentrated before cooling.

285.2 g (74.2% of theory) of a completely colourless, crystalline substance are obtained, melting at 131°C (Mettler FP 51; 1°C/minute). The elementary analysis shows the following values:

| Found | Calculated |
|---|---|
| 7.31% H | 7.34% H |
| 14.50% N | 14.58% N |

The H-NMR spectrum (100 Hz) agrees with the following structure:

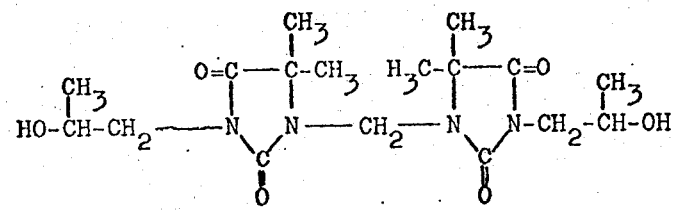

EXAMPLE 9

268.3 g (1 mol) of 1,1'-methylene-bis-(5,5-dimethylhydantoin) are suspended in 1,200 ml of deionised water and 3.16 g of lithium chloride are added. The resulting white suspension is gently stirred at room temperature and a solution of 110.1 g (2.5 mols) of ethylene oxide in 200 ml of dioxane is added all at once. The mixture is warmed to 55°C over the course of 150 minutes and is subsequently kept at this temperature for 2 hours. The reaction solution is then heated to 90°–92°C over the course of a further 2 hours. Thereafter it is stirred for 4 more hours at this temperature. Approx. 700 ml of solvent are then distilled off and the concentrate is filtered and cooled. After drying for 30 hours over $P_2O_5$ at 25°C/0.2 mm Hg, 310.1 g of a completely colourless crystalline substance are obtained, which melts at 163.9°C (Mettler FP 51; speed of heating 1°C/minute) and which consists of 1,1'-methylene-bis-[3-(2'-hydroxyethyl)-5,5-dimethylhydantoin].

EXAMPLE 10

A mixture of 544 g (2.03 mols) of 1,1'-methylene-bis-(5,5-dimethylhydantoin), 4.5 litres of water, 10.1 g of lithium chloride and 500 ml of dioxane is stirred at 90°C. 493 g of 95 percent strength (4.77 mols) of cyclohexene oxide are added dropwise to this suspension over the course of 3 hours. In the course of the reaction, the suspension becomes thinner and only a little material remains undissolved. After the dropwise addition, the mixture is stirred for a further 12 hours at 98°C and is allowed to cool to 30°C, unreacted starting material is filtered off, the filtrate is cooled to 5°C and the reaction product which has precipitated is filtered off. After drying at 100°C/15 mm Hg over $P_2O_5$, 522 g (53% of theory) of a completely colourless, crystalline substance are obtained, melting at 229.0°C (Mettler FP 51; speed of heating 1°C/minute). The elementary analysis shows the following:

| Found | Calculated |
|---|---|
| 60.2% C | 59.46% C |
| 7.5% H | 7.8% H |

The product corresponds to the formula

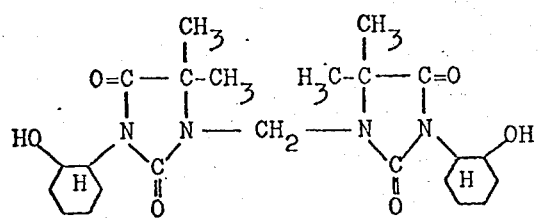

COMPARISON EXAMPLE

Since the diols manufactured according to the new process for the manufacture of polycondensates, 1,1'-methylene-bis-[3-('-hydroxyethyl)-5,5-dimethylhydantoin] manufactured according to the previously known process, and manufactured according to the process of the invention, are contrasted, in the following comparison experiment, with respect to their stability behaviour in the melt under polycondensation conditions.

| 1,1'-Methylene-bis-[-3(2'-hydroxyethyl)-5,5-dimethylhydantoin] manufactured according to: | Behaviour (heat exposure at 280°C in a glass bomb tube under nitrogen | |
|---|---|---|
| | Duration of treatment (hours) | Colour |
| 1) Helv.Chim.A. 55, 688 (1972); substance recrystallised once from dioxane. | 0.5<br>1.0<br>4.0 | Brown<br>Black<br>Black |
| 2) Helv.Chim.A. 55, 688 (1972); substance recrystallised twice from dioxane | 0.5<br>1.0<br>4.0 | Yellow<br>Brown<br>Black |
| 3) Example 1 according to the present application; substance not recrystallised | 0.5<br>1.0<br>4.0 | Colourless<br>Colourless<br>Light yellow |

This experiment shows that the diols manufactured according to the process of the invention are more suitable for polycondensation purposes since they do not discolour, or only discolour very slightly, under polycondensation conditions. On the other hand, the diols of the same formula manufactured according to the known process show, even in a repeatedly purified form, severe discolourations after a short time under identical conditions.

EXAMPLE 11

A mixture of 804.9 g (3.0 mols) of 1,1'-methylene-bis-(5,5-dimethylhydantoin) and 9.5 g of lithium chloride in 3.6 litres of 30 percent strength aqueous dioxane is stirred at 90°C. 485.5 g of 98 percent strength 1,2-butene oxide (6.6 mols) are added dropwise to this suspension over the course of 3 hours, producing a clear, colourless solution. Thereafter the reaction solution is stirred for a further 6 hours at 90°C and cooled to room temperature, its pH is adjusted to 7 with a little 50 percent strength sulphuric acid, and the solution is completely concentrated on a rotary evaporator. After drying the residue to constant weight under 0.5 mm Hg at 120°C, 1,215.5 g (98.2 percent of theory) of a somewhat coloured, brittle resin are obtained, of which the micro-analysis gives the following values:

| Found: | Calculated: |
|---|---|
| 7.8% H | 7.82% H |
| 13.4% N | 13.58% N |

Recrystallisation from ethyl acetate (ratio of substance to solvent = 1:0.8) gives a pure, completely colourless product (722 g = 58.4 percent of theory), which melts at 100.6°C (Mettler FP 51; 1°C/minute). The thin layer chromatogram (migrating agent: a solvent mixture of cyclohexane, ethyl acetate and glacial acetic acid in the ratio of 30.50: 20) shows that the product is free of impurities (refraction value: RF = 0.78). The mass spectrum demonstrates, through the molecular ion at 412 MU (mass units) and through characteristic fragment ions, that the formula shown below applies; this is also shown by the proton-magnetic resonance spectrum. The microanalysis shows:

| Found: | Calculated: |
|---|---|
| 55.40% C | 55.32% C |
| 7.80% H | 7.82% H |
| 13.30% N | 13.58% N |

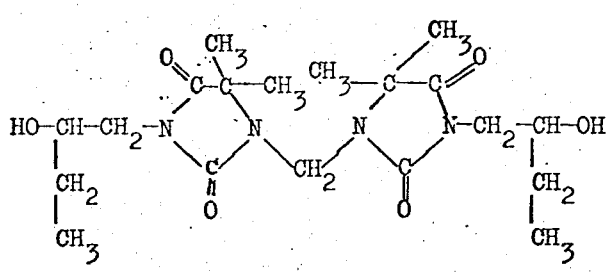

EXAMPLE 12

A mixture of 671 g (1.5 mols) of 1,1'-methylene-bis-(5,5-dimethylhydantoin) and 7.95 g of lithium chloride in 3 litres of 60 percent strength aqueous dioxane is stirred at 90°C. 661 g (5.5 mols) of styrene oxide are added dropwise over the course of 2.5 hours, whereupon the white suspension changes to a colourless solution. Thereafter the mixture is stirred for a further 2 hours at 90°C.

The crude product is isolated as described in Example 11. 1,199 g (94.3% of theory) of a colourless, brittle, glassy substance are obtained. the microanalysis shows:

| Found: | Calculated: |
|---|---|
| 6.40% H | 6.34% H |
| 11.00% N | 11.02% N |

The substance can be purified further by recrystallisation from ethanol (ratio of substance: solvent = 2.2:1). The colourless crystals were suspended in ether and subsequently dried. Completely colourless, fine crystals are obtained, melting at 153.8°C (Mettler FP 51; 1°C/minute). The proton-magnetic resonance spectrum agrees with the formula shown below. The microanalysis shows:

| Found: | Calculated: |
|---|---|
| 63.29% C | 63.76% C |
| 6.72% H | 6.34% H |
| 10.71% N | 11.02% N |

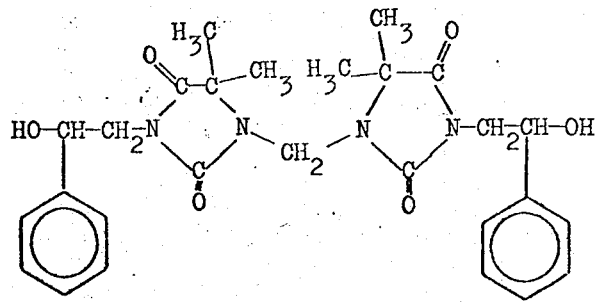

We claim:

1. In the process for the manufacture of 1,1'-methylene-bis-[3-(2'-hydroxyalkyl-hydantoin] compounds of the formula

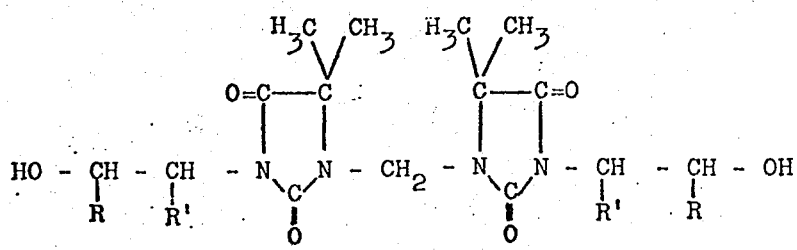

wherein R each denote a hydrogen atom, methyl, ethyl or phenyl and R' denotes a hydrogen atom or, together with R denotes the tetramethylene radical, by catalytic addition reaction of ethylene oxide, propylene oxide, butylene oxide, cyclohexene oxide styrene oxide to 1,1-'-methylene-bis-(5,5-dimethylhydantoin) in the presence of neutral or alkaline catalysts the improvement which consists in using as solvents water or 1–60 percent strength aqueous dioxane solution.

2. Process according to claim 1, characterised in that the addition reaction is carried out in deionised water.

3. Process according to claim 1, characterised in that the addition reaction is carried out in a 1–30 percent strength aqueous dioxane solution.

* * * * *